(No Model.)
J. H. QUINTON.
HORSE HITCHING DEVICE.
No. 483,514. Patented Sept. 27, 1892.
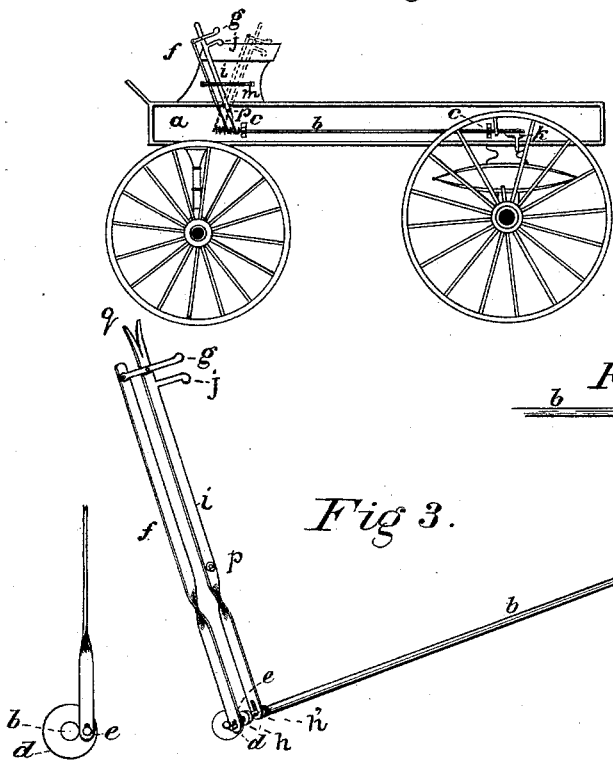
Fig 1.
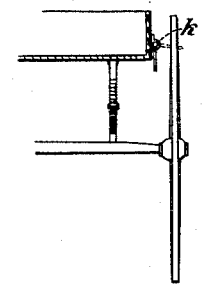
Fig 2.
Fig 4.
Fig 3.
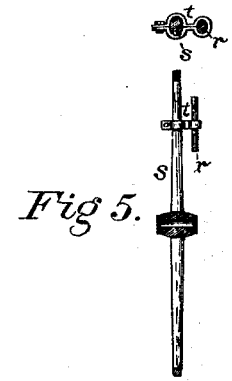
Fig 5.
Witnesses
Emil Schastt
William Rethlefsen
John H. Quinton
Inventor
by T. Geisler
his Attorney

UNITED STATES PATENT OFFICE.

JOHN H. QUINTON, OF PORTLAND, OREGON.

HORSE-HITCHING DEVICE.

SPECIFICATION forming part of Letters Patent No. 483,514, dated September 27, 1892.

Application filed June 4, 1891. Serial No. 395,276. (No model.)

*To all whom it may concern:*

Be it known that I, JOHN H. QUINTON, a citizen of the United States, residing at Portland, Multnomah county, Oregon, have invented a new and useful Improvement in Rein-Holding Devices, of which the following is a specification, reference being had to the accompanying drawings as a part hereof.

My invention relates to contrivances to be attached to wagons and adapted to hold and draw in the horse's reins, so as to check the animal should the same attempt to start when left standing alone.

It is my object to construct a simple device for this purpose that can be adjusted to check the horse slightly or severely, according to the temper of the animal, and the use of which device would not be attended with any danger of jerking the animal too suddenly, and said device being so constructed as to act when the horse moves forward only and not when backing, and therefore does not urge the animal to continue to back up, which might cause the same to be thrown and result in either injuring the horse or frightening the same, so as to become unmanageable.

The construction and mechanism of my invention will appear from the accompanying drawings.

Figure 1 is a side elevation showing my invention attached to a wagon. Fig. 2 is a cross-section, also showing an end view of one of the hind wheels. Fig. 3 is a perspective view of the essential mechanism of my invention, and Figs. 4 and 5 are details.

$a$ is the side of the wagon, and $b$ is a rod horizontally supported on the side of the wagon by means of staples $c$ or like contrivances, so as to admit of sliding lengthwise, such rod $b$ having on one end a disk $d$ (see Fig. 3) or equivalent device, provided with a pin $e$, on which a rod $f$ is pivoted, the upper end of which rod $f$ is pivotally connected with a hand-lever $g$. The lever $i$ is pivotally attached to the side of the wagon at $p$, the lower end of such lever being slotted and loosely secured on the rod $b$, between the collars $h\ h'$, and the upper end having a rigid handle $j$ and being pivotally connected with the hand-lever $g$. $k$ is an adjustable arm (see Fig. 4) pivotally attached to said rod $b$, so that the same will resist pressure exerted against it to the left, but offer no resistance to pressure in an opposite direction, and a spring $l$ keeping such arm at right angles to said rod. The rod or rail $m$ holds the levers $f$ and $i$ in place.

Now to operate my device the hand-lever $g$ and handle $j$ are brought together and the reins wrapped around them to secure them in that position. While doing this, the lever $g$ is necessarily pressed down, whereby the rod $f$ is raised a trifle, which action turns the rod $b$ a quarter of a circle, and thus brings the arm $k$ at about right angles to the sides of the wagon and projecting the same between the spokes of one of the hind wheels. If now the horse attempts to start, as he pulls the wagon along the wheels, between the spokes of which the arm $k$ was inserted, revolving to the left, the spoke nearest to the arm $k$ will be brought in contact therewith and abut against the same in the continued rotation of the wheel. The arm $k$ resisting the pressure of the spoke abutting against it, the rod $b$ will necessarily be pushed lengthwise, pushing the levers $f$ and $i$ back, as shown in dotted lines in Fig. 1, and while doing so drawing in the reins and so checking and holding the horse. In case the spokes of the wheel, against which the arm $k$ projects, are set too closely together and therefore do not give my checking device sufficient latitude of motion, causing the same to check the horse suddenly on a very slight forward movement, I make use of false spokes $r$, as shown in Fig. 5, which may be attached to the spokes of the wheel by means of the clamp $t$, being set at suitable distances apart. Should the horse start to back, my device would cease to check, as the arm $k$ would offer no resistance to the turning of the wheel, permitting the spokes thereof to pass it, and said arm $k$ would right itself again by means of said spring $l$ as soon as the spoke abutting against it on a revolution of the wheel to the right had passed and would be then in position to operate the checking device should the horse start forward. The driver being ready to start with his wagon mounts the seat and unwraps the reins from the lever $g$ and handle $j$, and the rod $f$ and rod $b$ being thus released the arm $k$ (said arm $k$ being made sufficiently heavy) will drop down, and thus clear the wheel and no longer interfere therewith. The upper end of the lever i may be forked at q, as shown in Fig. 3, to afford a further hold for the reins. The pivot p, by means of which the lever i is attached to the side of the wagon, may be made adjustable or adjusted to suit the throw it is desired to give said levers f and i and the length the reins are to be drawn in on the horse when my device operates to check the same.

Now what I claim, and desire to secure by Letters Patent, is—

1. A rein-holding device consisting, substantially, of a rod b, horizontally supported on one side of the wagon or vehicle in suitable bearings, enabling said rod to be moved lengthwise, and said rod b, having an arm k pivoted on it, adapted to engage the spokes of one of the wheels, substantially as described, a lever i, pivotally secured on the side of the wagon and provided with a handle j, the lower end of which lever has a vertical slot and is loosely held on said rod b between collars h h', a rod f, the lower end of which is pivotally fastened to a suitable crank fixed on said rod b and affording means for turning the latter, so as to project the said arm k between the spokes of the wheel coacting therewith, as described, the upper ends of said lever i and rod f being pivotally connected with each other by a lever g, and the wagon being provided with a suitable rail m for holding such lever and rod in place, all in combination, as and for the purposes set forth.

2. The combination, with a wagon or vehicle one of the wheels of which is provided with a number of false spokes secured to the true spokes by suitable means, for the purposes specified, of a rein-holding device consisting, substantially, of a rod b, horizontally supported on one side of the wagon in suitable bearings, enabling said rod to be moved lengthwise, and said rod b, having an arm k pivoted on it, adapted to engage the spokes of one of the wheels, substantially as described, a lever i, pivotally secured on the side of the wagon and provided with a handle j, the lower end of which lever has a vertical slot and is loosely held on the said rod b between collars h h', a rod f, the lower end of which is pivotally fastened to a suitable crank fixed on said rod b and affording means for turning the latter, so as to project the said arm k between the spokes of the wheel coacting therewith, as described, the upper ends of said lever i and rod f being pivotally connected with each other by a lever g, and the wagon being provided with a suitable rail m for holding such lever and rod in place, substantially as set forth.

JOHN H. QUINTON.

Witnesses:
GEO. W. SARGEANT,
T. J. GEISLER.